(12) United States Patent
Xia et al.

(10) Patent No.: US 11,994,695 B2
(45) Date of Patent: May 28, 2024

(54) FLY-EYE LENS MODULE, LIGHTING DEVICE, AND DLP OPTICAL ENGINE

(71) Applicant: IVIEW DISPLAYS (SHENZHEN) COMPANY LTD., Shenzhen (CN)

(72) Inventors: Yexin Xia, Shenzhen (CN); Liang Mei, Shenzhen (CN); Mingnei Ding, Shenzhen (CN); Steve Yeung, Hongkong (CN); Zhiqiang Gao, Hongkong (CN)

(73) Assignee: IVIEW DISPLAYS (SHENZHEN) COMPANY LTD., Shenzhen (CN)

( * ) Notice: Subject to any disclaimer, the term of this patent is extended or adjusted under 35 U.S.C. 154(b) by 0 days.

(21) Appl. No.: 18/311,948

(22) Filed: May 4, 2023

(65) Prior Publication Data

US 2023/0273349 A1    Aug. 31, 2023

Related U.S. Application Data

(63) Continuation of application No. PCT/CN2021/106873, filed on Jul. 16, 2021.

(30) Foreign Application Priority Data

May 7, 2021    (CN) .......................... 202110496628.5

(51) Int. Cl.
*G02B 3/00* (2006.01)
*F21V 5/00* (2018.01)
*G02B 27/09* (2006.01)

(52) U.S. Cl.
CPC ............ *G02B 3/0056* (2013.01); *F21V 5/004* (2013.01); *G02B 27/0961* (2013.01)

(58) Field of Classification Search
CPC .............. G02B 3/0056; G02B 27/0961; G02B 3/0037; G02B 27/0927; G02B 1/00;
(Continued)

(56) References Cited

U.S. PATENT DOCUMENTS 4,884,869 A * 12/1989 Uemura .............. G03F 7/70058
359/741
5,594,526 A * 1/1997 Mori ..................... G02B 3/0056
359/620
(Continued)

FOREIGN PATENT DOCUMENTS

CN    101025447 A    8/2007
CN    103529629 B    12/2015
(Continued)

*Primary Examiner* — Bao Q Truong
(74) *Attorney, Agent, or Firm* — IPRO, PLLC (57) ABSTRACT

The present disclosure provides a fly-eye lens module, a lighting device, and a DLP optical engine. The fly-eye lens module includes a first plastic fly-eye lens, a second plastic fly-eye lens, and a glass triangular prism structure. The first plastic fly-eye lens is provided on a surface thereof with a first circular region, and the second plastic fly-eye lens is provided on a surface thereof with a second circular region. The first and the second circular regions are both configured as a fly-eye structure having a concave-convex structure, and are respectively fixed to two sides of the cuboid glass structure by a bonding agent. The second and the first plastic fly-eye lenses are disposed such that the light spot emitted from the point light source is incident to the fly-eye lens module via the first plastic fly-eye lens, and is emitted from the second plastic fly-eye lens.

20 Claims, 4 Drawing Sheets

(58) Field of Classification Search
CPC ........ G02B 1/041; G02B 3/00; G02B 3/0006;
G02B 27/0955; G02B 27/0938; F21V
5/004; F21V 5/00; F21V 5/002
See application file for complete search history.

(56) References Cited

U.S. PATENT DOCUMENTS

| | | | |
|---|---|---|---|
| 7,638,027 | B2 | 12/2009 | Teshima et al. |
| 8,403,496 | B2* | 3/2013 | Qu .................... G02B 13/16 |
| | | | 353/38 |
| 9,784,890 | B2 | 10/2017 | Ishii et al. |
| 9,946,145 | B2* | 4/2018 | Miura ................. G02B 27/141 |
| 10,101,504 | B2 | 10/2018 | Matsushima et al. |
| 2006/0285214 | A1* | 12/2006 | Haga ................ B29D 11/00278 |
| | | | 359/619 |
| 2007/0147041 | A1* | 6/2007 | Shiratsuchi ............. F21V 5/008 |
| | | | 362/268 |
| 2012/0249621 | A1* | 10/2012 | Miura ................. H04N 9/3111 |
| | | | 345/694 |
| 2021/0026041 | A1 | 1/2021 | Ehara |

FOREIGN PATENT DOCUMENTS

| | | |
|---|---|---|
| CN | 107193064 A | 9/2017 |
| CN | 107422594 A | 12/2017 |
| CN | 109655945 B | 8/2020 |
| CN | 112596332 A | 4/2021 |
| CN | 215117014 U | 12/2021 |

* cited by examiner

FLY-EYE LENS MODULE, LIGHTING DEVICE, AND DLP OPTICAL ENGINE

CROSS-REFERENCE TO RELATED APPLICATIONS

This application is a continuation-application of International (PCT) Patent Application No. PCT/CN2021/106873, filed on Jul. 16, 2021, which claims priority to Chinese Patent Application No. 202110496628.5, filed with the National Intellectual Property Administration of China on May 7, 2021, and entitled "FLY-EYE LENS MODULE, LIGHTING DEVICE, AND DLP OPTICAL ENGINE", the entire contents of which are incorporated herein by reference.

TECHNICAL FIELD

Embodiments of the present disclosure relate to the technical field of optical lens, and in particular, relate to a fly-eye lens module, a lighting device, and a DLP optical engine.

BACKGROUND

During the operation of a DLP (digital light processing) optical engine, an optical fly-eye lens in the DLP optical engine is affected by an absorption rate. Under the irradiation of visible light excited by an LED (light emitting diode) light source, an optical power of a small amount of visible light is converted into thermal power under the action of the absorption rate of the optical fly-eye lens, and finally energy conversion is achieved by the way that the temperature of the fly-eye rises.

During practice of the embodiments of the present disclosure, the present inventors have found that the above related arts have at least the following problems: high-precision optical fly-eye lenses currently used in the market are mostly made of glass or plastic materials, and lenses made of these two types of materials have their own advantages and disadvantages. High-precision glass fly-eye lenses have good reliability, high temperature resistance, and good material stability, but are complicated in molding and have a high cost. The plastic fly-eye lenses are relatively simple to mold and have a low cost, but the plastic fly-eye lenses are not resistant to high temperature and are prone to yellowing, and thus reliability is poor.

SUMMARY

An embodiment of the present disclosure provides a fly-eye lens module. The fly-eye lens module includes: a first plastic fly-eye lens, provided on a surface thereof with a first circular region, wherein the first circular region is configured as a fly-eye structure having a concave-convex structure, and the first circular region is configured to receive a circular light spot emitted from a point light source; a second plastic fly-eye lens, provided on a surface thereof with a second circular region, wherein the second circular region is configured as a fly-eye structure having a concave-convex structure, and the second circular region is configured to emit a homogenized circular light spot; and, a cuboid glass structure, wherein the first plastic fly-eye lens and the second plastic fly-eye lens are fixed to two sides of the cuboid glass structure respectively by a bonding agent; wherein the second plastic fly-eye lens and the first plastic fly-eye lens are disposed such that the light spot emitted from the point light source is incident to the fly-eye lens module via the first plastic fly-eye lens, and is emitted from the second plastic fly-eye lens.

An embodiment of the present disclosure provides a lighting device. The lighting device includes: a point light source, configured to emit a light spot; and the fly-eye lens module as described above, disposed in a light emitting direction of the point light source, and configured to convert the light spot to a homogenized light spot.

An embodiment of the present disclosure provides a DLP optical engine. The DLP optical engine includes: the lighting device as described above; a DMD chip, disposed in a light emitting direction of the lighting device, and configured to receive the homogenized light spot emitted from the lighting device and emit a light beam containing image information; and a lens group, disposed in a light emitting direction of the DMD chip, and configured to output an imaging light beam.

BRIEF DESCRIPTION OF THE DRAWINGS

One or more embodiments are illustrated by way of example, and not by limitation, in the figures of the accompanying drawings, wherein elements/modules having the same reference numeral designations represent like elements/modules throughout. The drawings are not to scale, unless otherwise disclosed.

DETAILED DESCRIPTION

The present disclosure is further described with reference to some exemplary embodiments. The embodiments hereinafter facilitate further understanding of the present disclosure for a person skilled in the art, rather than causing any limitation to the present disclosure. It should be noted that, persons of ordinary skill in the art may derive various variations and modifications without departing from the inventive concept of the present disclosure. Such variations and modifications shall pertain to the protection scope of the present disclosure.

For clearer descriptions of the objectives, technical solutions, and advantages of the present disclosure, the present disclosure is further described with reference to specific embodiments and attached drawings. It should be understood that the specific embodiments described herein are only intended to explain the present disclosure instead of limiting the present disclosure.

It should be noted that, in the absence of conflict, embodiments of the present disclosure and features in the embodiments may be incorporated, which all fall within the protection scope of the present disclosure. In addition, although function module division is illustrated in the schematic diagrams of devices, and in some occasions, module division different from the divisions of the modules in the devices may be used. Further, the terms "first," "second," and the like used in this text do not limit data and execution sequences, and are intended to distinguish identical items or similar items having substantially the same functions and effects. It should be noted that, when an element is defined as "being secured or fixed to" another element, the element may be directly positioned on the element or one or more centered elements may be present therebetween.

Unless the context clearly requires otherwise, throughout the specification and the claims, technical and scientific terms used herein denote the meaning as commonly understood by a person skilled in the art. Additionally, the terms used in the specification of the present disclosure are merely for description the embodiments of the present disclosure, but are not intended to limit the present disclosure.

In addition, technical features involved in various embodiments of the present disclosure described hereinafter may be combined as long as these technical features are not in conflict.

Figure 1:
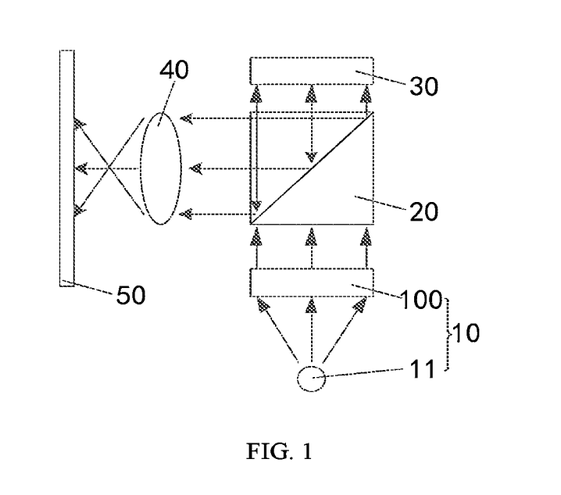
FIG. 1 is a schematic view of an application environment of a fly-eye lens module according to an embodiment of the present disclosure.

In order to address the problem that the conventional fly-eye lenses on the market may not simultaneously satisfy the requirements of low cost, high thermal conductivity, good reliability, and simple fabricating process, embodiments of the present disclosure provide a fly-eye lens module with composite materials, which has the advantages of simple fabricating process, low price, good overall reliability, and high thermal conductivity. FIG. 1 is a schematic view of an application environment of a fly-eye lens module according to an embodiment of the present disclosure. The application environment involves: a lighting device 10, a total internal reflection (TIR) prism 20, a digital micromirror device (DMD) chip 30, a lens group 40, and an imaging screen 50. These devices constitute a digital light processing (DLP) optical engine.

The lighting device 10 includes a fly-eye lens module 100 and a point light source 11 according to the embodiment of the present disclosure. The point light source 11 may be a light source emitting light from a point towards the surroundings, which is capable of emitting light beams in different directions. The point light source 11 may be an LED light source, which, when being turned on, is capable of outputting different light beams in the same direction. During receiving the light source in any direction, the light source emits light spots having non-homogenized luminances. The fly-eye lens module 100 is capable of converting the light spots with non-homogenized luminances into homogenized light spots and outputting the homogenized light spots.

With the configuration as illustrated in FIG. 1, the TIR prism 20 (a total internal reflection prism) is capable of transmitting and emitting the light spot output after being homogenized by the fly-eye lens module 100 and reflecting an imaging light beam output by the DMD chip 30. It should be noted that, in some other embodiments, the TIR prism 20 may not be provided. Specifically, the TIR prism may be selectively used according to the design of an actual light path.

The DMD chip 30 is a digital micromirror element, and in response to receiving an illumination light source output by the lighting device 10, the DMD chip 30 may be excited to generate the imaging light beam, and the imaging light beam is reflected and emitted via the TIR prism 20.

The lens group 40 is arranged in a light emitting direction of the TIR prism 20, may enlarge or reduce the imaging light beam reflected and emitted by the TIR prism 20, and may adjust a focal length and distortion of an imaging image. The lens group 40 includes at least one lens. Specifically, whether or not the lens group 40 needs to be provided, and the setting of each lens in the lens group 40 may be selected according to actual needs.

The imaging screen 50 is configured to receive the imaging light beam and form the imaging image, and the material thereof may be selected according to actual needs. Preferably, the imaging screen 50 is set at a focal point of the light emitting direction of the lens group 40.

The lighting device 10 made of the fly-eye lens module according to the embodiment of the disclosure is capable of emitting homogenized illumination light, and the DLP optical engine made of the fly-eye lens module according to the embodiment of the disclosure is capable of outputting the imaging light beam with homogenized brightness and forming the imaging image with homogenized brightness.

Hereinafter, the embodiments of the present disclosure are further illustrated with reference to the accompanying drawings.

Figure 2:
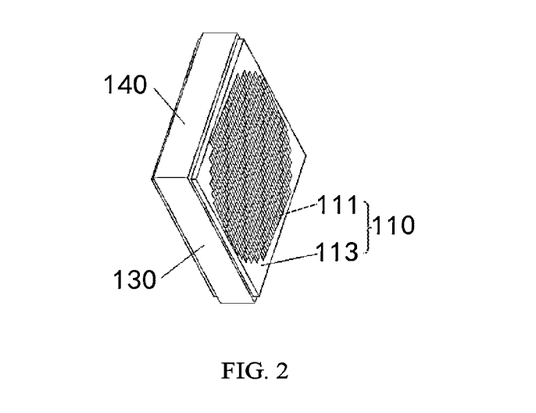
FIG. 2 is a schematic structural view of a fly-eye lens module at a first viewing angle according to an embodiment of the present disclosure.
Figure 3:
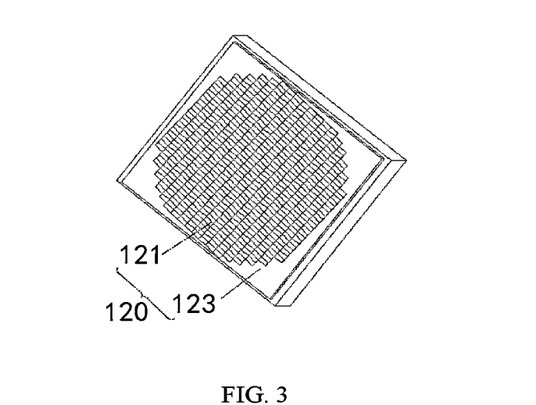
FIG. 3 is a schematic structural view of the fly-eye lens module at a second viewing angle according to the embodiment of the present disclosure shown in FIG. 2.

An embodiment of the present disclosure provides a fly-eye lens module. Referring to FIG. 2 and FIG. 3, FIG. 2 and FIG. 3 illustrate structures of a fly-eye lens module 100 at two viewing angles according to an embodiment of the present disclosure. The fly-eye lens module 100 includes: a first plastic fly-eye lens 110, a second plastic fly-eye lens 120, and a cuboid glass structure 130.

The first plastic fly-eye lens 110 is provided on a surface thereof with a first circular region 111, wherein the first circular region 111 is configured as a fly-eye structure having a concave-convex structure, and the first circular region 111 is configured to receive a circular light spot emitted from a point light source.

The second plastic fly-eye lens 120 provided on a surface thereof with a second circular region 121, wherein the second circular region 121 is configured as a fly-eye structure having a concave-convex structure, and the second circular region 121 is configured to emit a homogenized circular light spot; and The fly-eye structure is composed of a variable number of small lenses arranged in a tiled fashion. As illustrated in FIG. 2 and FIG. 3, the fly-eye structure is composed of a plurality of concave-convex small lenses periodically arranged. In some other embodiments, the fly-eye structure may be configured according to actual needs, which is not limited to the embodiment of the present disclosure.

The first plastic fly-eye lens 110 and the second plastic fly-eye lens 120 are respectively fixed to two sides of the cuboid glass structure 130 by a bonding agent; and the second plastic fly-eye lens 120 and the first plastic fly-eye lens 110 may be disposed such that the light spot emitted from the point light source is incident to the fly-eye lens module via the first plastic fly-eye lens 110, and is emitted from the second plastic fly-eye lens 120. For example, the second plastic fly-eye lens 120 and the first plastic fly-eye lens 110 may be centrosymmetrically disposed. Alternatively, each of the second plastic fly-eye lens 120 and the first plastic fly-eye lens 110 may be a centrosymmetric structure.

In the embodiment of the present disclosure, since thermal conductivity of a glass material is higher than that of a plastic material and material reliability is higher, the molding process of the fly-eye concave-convex structure made of the plastic material is simpler than that of the fly-eye concave-convex structure made of the glass material, and the plastic material is poorer than the glass material in terms of reliability. Based on the respective advantages and disadvantages of these two materials, the fly-eye structure in the embodiment of the present disclosure is divided into the cuboid glass structure 130 with a glass material structure in the center, and an optical structure with a complex fly-eye concave-convex lens characteristic, which is formed by an injection molding process and the like using the plastic material on both sides thereof, that is, the first plastic fly-eye lens 110 and the second plastic fly-eye lens 120. In this way, the fly-eye lens module 100 is fabricated. The heat generated during the operation of the fly-eye lens module 100 is quickly conducted to the cuboid glass structure 130 via the first plastic fly-eye lens 110 and the second plastic fly-eye lens 120 which are thin and have large areas, and then is quickly conducted to a low temperature region via the cuboid glass structure 130, such that heat concentration in a high temperature region of the fly-eye lens module is reduced and an overall temperature rise of the fly-eye lens module 100 is decreased. It should be noted that, the first plastic fly-eye lens 110 and the second plastic fly-eye lens 120 are required to be as thin as possible during the molding process, and a plastic structure 113 surrounding the two sides of the first plastic fly-eye lens 110 and a plastic structure 123 surrounding the two sides of the second plastic fly-eye lens 120 also need to be made as small as possible, to reduce an overall thermal resistance of the fly-eye lens module 100, and accelerate heat dissipation.

In some embodiments, referring to FIG. 2 and FIG. 3, a plastic housing 140 is disposed on each of the other four sides 133, not provided with the first plastic fly-eye lens 110 and the second plastic fly-eye lens 120, of the cuboid glass structure 130. The plastic housing 140 may be directly formed on the four sides 133 of the cuboid glass structure 130 by integral injection molding, or may be fixed to the cuboid glass structure 130 by means of snaps, threads, mortise-and-tenon structures, adhesives, or the like after being separately produced. Specifically, the plastic housing 140 be configured according to actual needs, which is not limited to the embodiments of the present disclosure.

In some embodiments, the bonding agent is an adhesive, and the first plastic fly-eye lens 110 and the second plastic fly-eye lens 120 are fixed to the two sides 130 of the cuboid glass structure by the adhesive. It should be noted that, during the bonding process, the fly-eye structure on the first plastic fly-eye lens 110 needs to be maintained aligned with the fly-eye structure on the second plastic fly-eye lens 120, such that light is normally transmitted and emitted.

Figure 4:
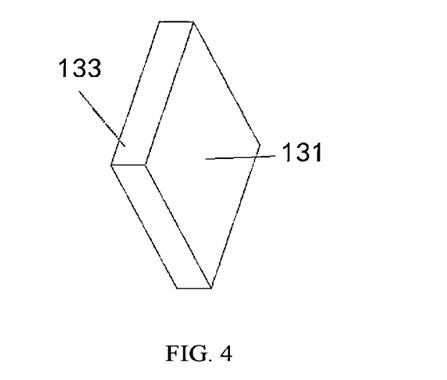
FIG. 4 is a schematic structural view of a cuboid glass structure at a first viewing angle according to an embodiment of the present disclosure.
Figure 5:
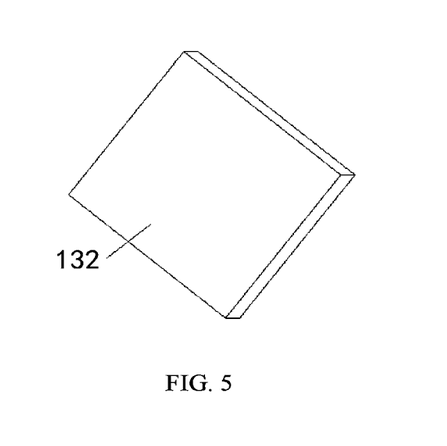
FIG. 5 is a schematic structural view of the cuboid glass structure at a second viewing angle according to the embodiment of the present disclosure shown in FIG. 4.

In some embodiments, referring to FIG. 4 and FIG. 5, FIG. 4 and FIG. 5 illustrate structures of a cuboid glass structure 130 at two viewing angles according to an embodiment of the present disclosure. A first side 131, to which the first plastic fly-eye lens 110 is fixed, of the cuboid glass structure 130 is disposed to be parallel to a second side 132, to which the second plastic fly-eye lens 120 is fixed, of the cuboid glass structure 130. Specifically, the first side 131 and the second side 132 of the cuboid glass structure 130 need to maintain high-precision flatness and parallelism to minimize the influence on a light emitting direction of a light path, such that the light may be emitted parallelly.

Figure 6:
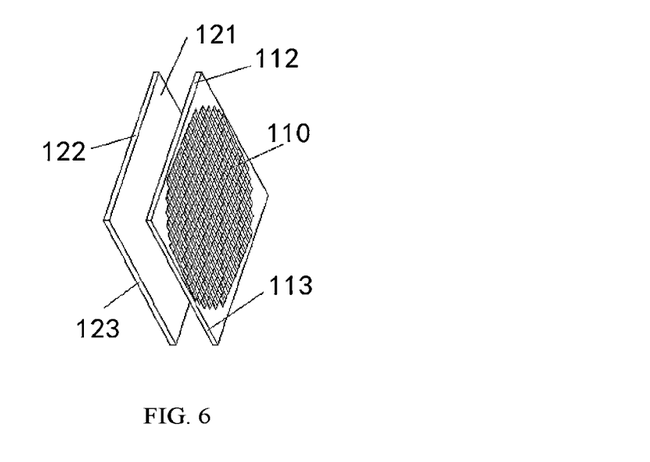
FIG. 6 is a schematic structural view of a first plastic fly-eye lens and a second plastic fly-eye lens at a first viewing angle according to an embodiment of the present disclosure.
Figure 7:
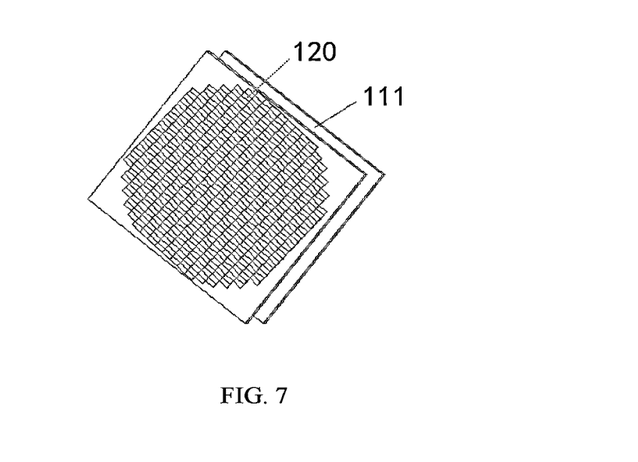
FIG. 7 is a schematic structural view of the first plastic fly-eye lens and the second plastic fly-eye lens at a second viewing angle according to the embodiment of the present disclosure shown in FIG. 6.

In some embodiments, referring to FIG. 6 and FIG. 7, FIG. 6 and FIG. 7 illustrate structures of the first plastic fly-eye lens and the second first plastic fly-eye lens at two viewing angles according to an embodiment of the present disclosure. The first plastic fly-eye lens 110 and the second plastic fly-eye lens 120 are parallelly disposed. Specifically, both a reference surface 111 of the first plastic fly-eye lens 110 and a reference surface 121 of the second plastic fly-eye lens 120 are required to maintain a high-precision flatness, and during a bonding process, it is also necessary to maintain the reference surface 111 of the first plastic fly-eye lens 110 at the center of the first side 131 of the cuboid glass structure 130, and the reference surface 121 of the second plastic fly-eye lens 120 at the center of the second side 132 of the cuboid glass structure 130. In addition, four lateral sides 112 of the first plastic fly-eye lens 110 need to maintain verticality, and four lateral sides 122 of the second plastic fly-eye lens 120 also need to maintain verticality.

In some embodiments, a surface area 111 of the first plastic fly-eye lens 110 is equal to a surface area of the first side 131 of the cuboid glass structure 130, and a surface area 121 of the second plastic fly-eye lens 120 is equal to a surface area of the second side 132 of the cuboid glass structure 130.

In some embodiments, the first plastic fly-eye lens 110 and the second plastic fly-eye lens 120 are identical in terms of structure. In the case that the first plastic fly-eye lens 110 and the second plastic fly-eye lens 120 are identical in terms of structure, only one mold is needed to fabricate the first plastic fly-eye lens 110 and the second plastic fly-eye lens 120, and the first plastic fly-eye lens 110 and the second plastic fly-eye lens 120 may be both used as the light incident side or the light emitting side during use. During mounting of the fly-eye lens module 100, whether mounting directions of the first plastic fly-eye lens 110 and the second plastic fly-eye lens 120 are correct do not need to be considered.

In some embodiments, an area of the fly-eye structure on the second plastic fly-eye lens 120 is greater than an area of the fly-eye structure on the first plastic fly-eye lens 110. In the case that the structure of the first plastic fly-eye lens 110 may be different from that of the second plastic fly-eye lens 120, although two molds are needed to respectively fabricate the first plastic fly-eye lens 110 and the second plastic fly-eye lens 120, due to a high production cost of the fly-eye structure, on the light incident side, that is, on the first plastic fly-eye lens 110, the area of the fly-eye structure is reduced. In addition, since the light spot incident to the fly-eye lens module 100 is less than the light spot emitted from the fly-eye lens module 100, in the case that the area of the fly-eye structure of the first plastic fly-eye lens 110 is reduced, the fly-eye lens module 100 is ensured to operate normally, and the fabrication cost is lowered.

Figure 8:
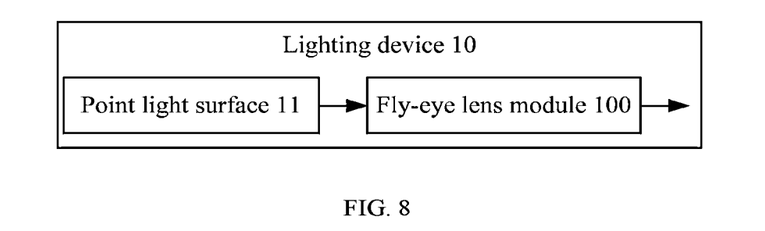
FIG. 8 is a schematic structural diagram of a lighting device according to an embodiment of the present disclosure.

An embodiment of the present disclosure provides a lighting device. Referring to FIG. 8, FIG. 8 illustrates a structure of a lighting device 10 according to an embodiment of the present disclosure. The lighting device 10 includes a point light source 11 and a fly-eye lens module 100.

The point light source 11 is configured to emit a light spot, and the point light source 11 may be a light source capable of outputting light beams in different directions. The point light source 11 may be the point light source 11 as described in the above application scenario and the embodiment. Specifically, reference may be made to the above application scenario and drawings thereof, and the aforesaid embodiments and the drawings thereof, which is not described herein any further.

The fly-eye lens module 100 is disposed in a light emitting direction of the point light source 11, and configured to convert the light spot to a homogenized light spot. The fly-eye lens module 100 may be the fly-eye lens module 100 as described in the embodiment. Specifically, reference may be made to the above application scenario and drawings thereof, and the aforesaid embodiments and the drawings thereof, which is not described herein any further.

Figure 9:
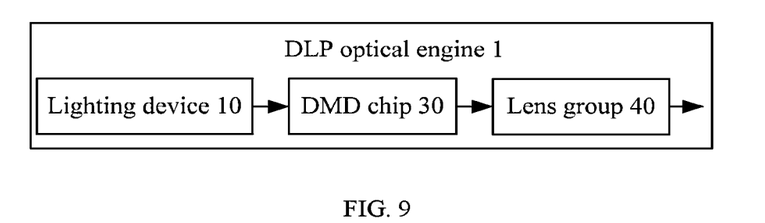
FIG. 9 is a schematic structural diagram of a DLP optical engine according to an embodiment of the present disclosure.

An embodiment of the present disclosure provides a DLP optical engine. Referring to FIG. 9, FIG. 9 illustrates a structure of a DLP optical engine 1 according to an embodiment of the present disclosure. The DLP optical engine 1 includes a lighting device 10, a DMD chip 30, and a lens group 40.

The lighting device 10 in this embodiment may be the lighting device 10 as described in the above application scenario and the aforesaid embodiments, and is configured to provide a light source for illumination. Specifically, reference may be made to the above application scenario and drawings thereof, the aforesaid embodiments and the drawings thereof, which is not described herein any further.

The DMD chip 30 is disposed in a light emitting direction of the lighting device, and configured to receive homogenized light spot emitted from the lighting device and emit a light beam containing image information. The DMD chip 30 may be the DMD chip 30 as described in the above application scenarios. Specifically, reference may be made to the above application scenarios and the drawings thereof, which is not described herein any further.

The lens group 40 is disposed in a light emitting direction of the DMD chip 30, and is configured to output an imaging light beam. The lens group 40 may be the lens group 40 as described in the above application scenarios. Specifically, reference may be made to the above application scenarios and the drawings thereof, which is not described herein any further.

Embodiments of the present disclosure provide a fly-eye lens module, a lighting device, and a DLP optical engine. The fly-eye lens module includes a first plastic fly-eye lens, a second plastic fly-eye lens, and a glass triangular prism structure. The first plastic fly-eye lens is provided on a surface thereof with a first circular region, and the second plastic fly-eye lens is provided on a surface thereof with a second circular region. The first circular region and the second circular region are both configured as a fly-eye structure having a concave-convex structure, and are respectively fixed to two sides of the cuboid glass structure by a bonding agent. The second plastic fly-eye lens and the first plastic fly-eye lens are centrosymmetrically disposed, such that the light spot emitted from the point light source is incident to the fly-eye lens module via the first plastic fly-eye lens, and is emitted from the second plastic fly-eye lens. The fly-eye lens module according to the embodiments of the present disclosure has a simple fabricating process, low price, good overall reliability, and high thermal conductivity.

It should be noted that, the above described device embodiments are merely for illustration purpose only. The units which are described as separate components may be physically separated or may be not physically separated, and the components which are illustrated as units may be or may not be physical units, that is, the components may be located in the same position or may be distributed into a plurality of network units. Part or all of the modules may be selected according to the actual needs to achieve the objects of the technical solutions of the embodiments.

Finally, it should be noted that, the above embodiments are merely used to illustrate the technical solutions of the present disclosure rather than limiting the technical solutions of the present disclosure. Under the concept of the present disclosure, the technical features of the above embodiments or other different embodiments may be combined, the steps therein may be performed in any sequence, and various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present disclosure.

The invention claimed is:

1. A fly-eye lens module, comprising:
   a first plastic fly-eye lens, provided on a surface thereof with a first circular region, wherein the first circular region is configured as a fly-eye structure having a concave-convex structure, and the first circular region is configured to receive a circular light spot emitted from a point light source;
   a second plastic fly-eye lens, provided on a surface thereof with a second circular region, wherein the second circular region is configured as a fly-eye structure having a concave-convex structure, and the second circular region is configured to emit a homogenized circular light spot; and
   a cuboid glass structure, wherein the first plastic fly-eye lens and the second plastic fly-eye lens are fixed to two sides of the cuboid glass structure respectively by a bonding agent;
   wherein the second plastic fly-eye lens and the first plastic fly-eye lens are disposed such that the light spot emitted from the point light source is incident to the fly-eye lens module via the first plastic fly-eye lens, and is emitted from the second plastic fly-eye lens.

2. The fly-eye lens module according to claim 1, wherein a plastic housing is disposed on each of the other four sides, not provided with the first plastic fly-eye lens and the second plastic fly-eye lens, of the cuboid glass structure.

3. The fly-eye lens module according to claim 2, wherein the bonding agent is an adhesive, and the first plastic fly-eye lens and the second plastic fly-eye lens are fixed to the two sides of the cuboid glass structure by the adhesive.

4. The fly-eye lens module according to claim 3, wherein a first side, to which the first plastic fly-eye lens is fixed, of the cuboid glass structure is disposed to be parallel to a second side, to which the second plastic fly-eye lens is fixed, of the cuboid glass structure.

5. The fly-eye lens module according to claim 4, wherein the first plastic fly-eye lens and the second plastic fly-eye lens are disposed to be parallel to each other.

6. The fly-eye lens module according to claim 5, wherein a surface area of a side of the first plastic fly-eye lens is equal to a surface area of the first side of the cuboid glass structure, and a surface area of a side of the second plastic fly-eye lens is equal to a surface area of the second side of the cuboid glass structure.

7. The fly-eye lens module according to claim 6, wherein the first plastic fly-eye lens and the second plastic fly-eye lens are identical in terms of structure.

8. The fly-eye lens module according to claim 6, wherein an area of the second circular region is greater than an area of the first circular region.

9. The fly-eye lens module according to claim 1, wherein the second plastic fly-eye lens and the first plastic fly-eye lens are centrosymmetrically disposed.

10. A lighting device, comprising:
a point light source, configured to emit a circular light spot; and
a fly-eye lens module, disposed in a light emitting direction of the point light source, and configured to convert the circular light spot to a homogenized circular light spot;
wherein fly-eye lens module comprises:
a first plastic fly-eye lens, provided on a surface thereof with a first circular region, wherein the first circular region is configured as a fly-eye structure having a concave-convex structure, and the first circular region is configured to receive the circular light spot emitted from the point light source;
a second plastic fly-eye lens, provided on a surface thereof with a second circular region, wherein the second circular region is configured as a fly-eye structure having a concave-convex structure, and the second circular region is configured to emit the homogenized circular light spot; and
a cuboid glass structure, wherein the first plastic fly-eye lens and the second plastic fly-eye lens are fixed to two sides of the cuboid glass structure respectively by a bonding agent;
wherein the second plastic fly-eye lens and the first plastic fly-eye lens are disposed such that the light spot emitted from the point light source is incident to the fly-eye lens module via the first plastic fly-eye lens, and is emitted from the second plastic fly-eye lens.

11. The lighting device according to claim 10, wherein a plastic housing is disposed on each of the other four sides, not provided with the first plastic fly-eye lens and the second plastic fly-eye lens, of the cuboid glass structure.

12. The lighting device according to claim 10, wherein a first side, to which the first plastic fly-eye lens is fixed, of the cuboid glass structure is disposed to be parallel to a second side, to which the second plastic fly-eye lens is fixed, of the cuboid glass structure.

13. The lighting device according to claim 12, wherein a surface area of a side of the first plastic fly-eye lens is equal to a surface area of the first side of the cuboid glass structure, and a surface area of a side of the second plastic fly-eye lens is equal to a surface area of the second side of the cuboid glass structure.

14. The lighting device according to claim 10, wherein the second plastic fly-eye lens and the first plastic fly-eye lens are centrosymmetrically disposed.

15. A DLP optical engine, comprising:
a lighting device, comprising:
a point light source, configured to emit a circular light spot; and
a fly-eye lens module, disposed in a light emitting direction of the point light source, and configured to convert the circular light spot to a homogenized circular light spot; wherein fly-eye lens module comprises:
a first plastic fly-eye lens, provided on a surface thereof with a first circular region, wherein the first circular region is configured as a fly-eye structure having a concave-convex structure, and the first circular region is configured to receive the circular light spot emitted from the point light source;
a second plastic fly-eye lens, provided on a surface thereof with a second circular region, wherein the second circular region is configured as a fly-eye structure having a concave-convex structure, and the second circular region is configured to emit the homogenized circular light spot; and
a cuboid glass structure, wherein the first plastic fly-eye lens and the second plastic fly-eye lens are fixed to two sides of the cuboid glass structure respectively by a bonding agent; wherein the second plastic fly-eye lens and the first plastic fly-eye lens are disposed such that the light spot emitted from the point light source is incident to the fly-eye lens module via the first plastic fly-eye lens, and is emitted from the second plastic fly-eye lens;
a DMD chip, disposed in a light emitting direction of the lighting device, and configured to receive the homogenized circular light spot emitted from the lighting device and emit a light beam containing image information; and
a lens group, disposed in a light emitting direction of the DMD chip, and configured to output an imaging light beam.

16. The DLP optical engine according to claim 15, wherein a plastic housing is disposed on each of the other four sides, not provided with the first plastic fly-eye lens and the second plastic fly-eye lens, of the cuboid glass structure.

17. The DLP optical engine according to claim 15, wherein a first side, to which the first plastic fly-eye lens is fixed, of the cuboid glass structure is disposed to be parallel to a second side, to which the second plastic fly-eye lens is fixed, of the cuboid glass structure.

18. The DLP optical engine according to claim 17, wherein the first plastic fly-eye lens and the second plastic fly-eye lens are disposed to be parallel to each other.

19. The DLP optical engine according to claim 18, wherein a surface area of a side of the first plastic fly-eye lens is equal to a surface area of the first side of the cuboid glass structure, and a surface area of a side of the second plastic fly-eye lens is equal to a surface area of the second side of the cuboid glass structure.

20. The DLP optical engine according to claim 15, wherein the second plastic fly-eye lens and the first plastic fly-eye lens are centrosymmetrically disposed.

* * * * *